Jan. 11, 1927.

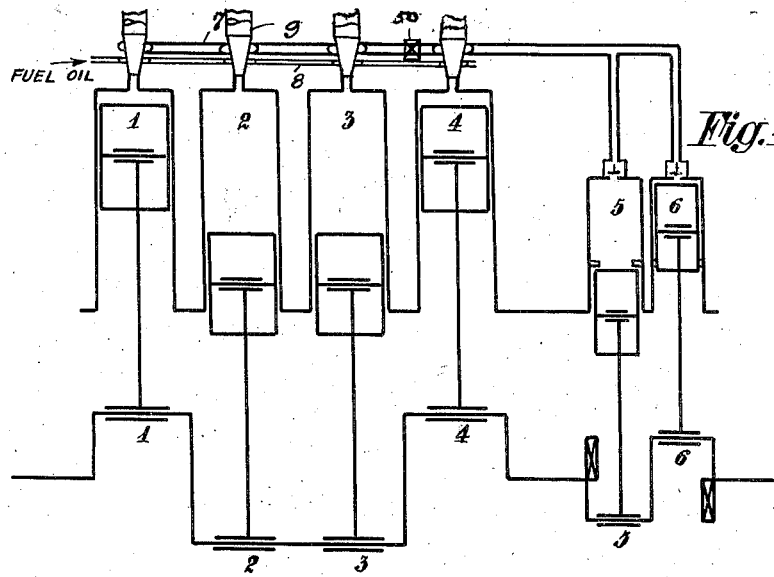
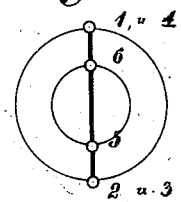
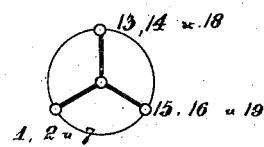
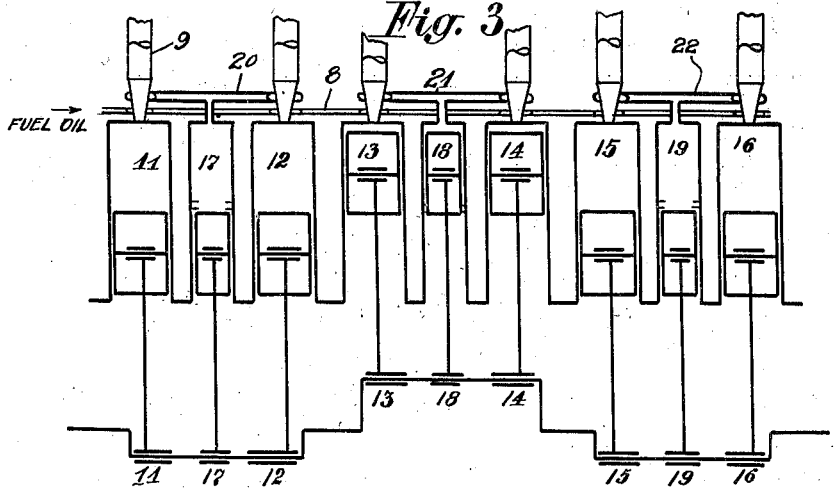

F. MÜLLER 1,613,618

MULTIPLE CYLINDER INTERNAL COMBUSTION ENGINE

Filed August 13, 1921   2 Sheets-Sheet 2

Inventor:
Friedrich Müller

Patented Jan. 11, 1927.

1,613,618

UNITED STATES PATENT OFFICE.

FRIEDRICH MÜLLER, OF VIENNA, AUSTRIA.

MULTIPLE-CYLINDER INTERNAL-COMBUSTION ENGINE.

Application filed August 13, 1921, Serial No. 492,194, and in Austria November 23, 1916.

(GRANTED UNDER THE PROVISIONS OF THE ACT OF MARCH 3, 1921, 41 STAT. L., 1313.)

The invention relates to multiple cylinder internal combustion engines of the type in which fuel is injected by means of compressed air into the working cylinder and in which the injection air is generated by injection air compressors. The object of the invention is to facilitate the starting of such engines. Before starting the engine is cold and therefore it is impossible that the compression in the injection air compressor is performed adiabatically. For this reason the pressure produced in the compressor is insufficient to effect the proper injection of the fuel into the working cylinder. The object of the invention is to overcome this drawback. For this purpose the injection air pipe of at least one working cylinder is connected not only to the corresponding air injection compressor but also at least to one of the injection air compressors corresponding to the other working cylinders, the working cylinder thus will receive much more injection air as in normal working. For starting the engine the working cylinder or working cylinders may therefore receive such a great quantity of injection air that the pressure necessary for the injection may be produced.

On the drawings:

Figure 1 is a diagrammatic layout of a four-cylinder engine with two air compressor cylinders at one end.

Figure 2 is a crank timing diagram therefor.

Figure 3 is a diagrammatic representation of a six cylinder engine with the cylinders arranged in pairs, each pair having an individual air compressor.

Figure 4 is a crank timing diagram therefor.

Figure 5:
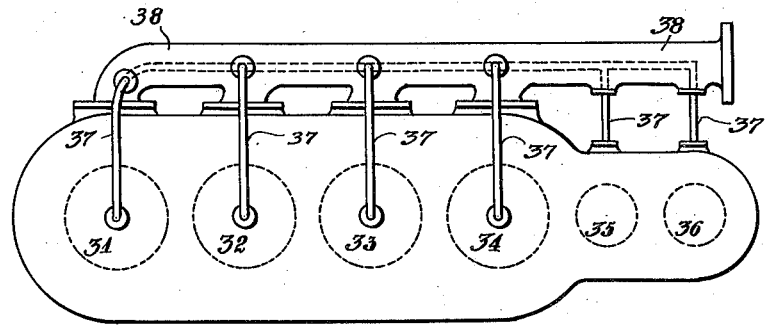
Figure 5 is a top plan view of a four-cylinder engine.

In Figs. 1 and 2 of the drawing a four-cylinder engine is shown by way of example, having a common connecting pipe between the working cylinders and compressor cylinders. The working cylinders are marked 1, 2, 3 and 4 and the smaller compressor cylinders 5 and 6. The latter are connected to the end of the engine and lie next to each other. The pistons, connecting rods and crank pins have the same reference number as the separate cylinders to which they belong. All the cylinders are connected by a common injection pipe 7, the dimensions of which may be reduced to the least admissible amount. A fuel pipe 8 and injection valves 9 are also shown. As will be seen from Fig. 2 the crank pins 1, 4 and 6 are all on the same side of the crank shaft and lie at 180° or approximately 180° to the crank pins 2, 3 and 5. Each compression end of the working cylinders thus coincides with a compression stroke end of the compressor cylinders. The working cylinders 1 and 4 are provided with injection air by the compressor cylinder 6 and the working cylinders 2 and 3 by the compressor cylinder 5. In the example shown in Figure 1 and Figure 2 the injection members of the cylinders 1, 2 and 3 are shut in starting the engine so that the injection air enters only in the cylinder 4, which is arranged next to the compressor cylinders. Therefore the cylinder 4 receives four times the quantity of injection air during the starting period and the pressure produced in the injection air pipe is high enough for starting the engine. The injection air is forced during the injection period directly into the working cylinders, whereby the time, during the injection air can cool in the connecting pipe 7, is limited to the moment of flowing across and detrimental losses of heat are avoided.

A constructional form is preferable in which two or more groups of two working cylinders each are formed with cylinders lying in the middle, the piston movements of which coincide in groups, and in which each group has an independent injection pipe. The object of admitting the injection air into the working cylinders in as hot a state as possible is completely effected by such an arrangement. Such a constructional form is shown in Figs. 3 and 4 as applied to a six-cylinder engine.

The working cylinders 11, 12, 13, 14, 15 and 16 and the small compressor cylinders 17, 18 and 19 are so placed that each compressor cylinder lies in the middle between each two working cylinders. The crank pins, cranks and connecting rods of each cylinder bear the same reference number as the cylinders. The crank pins lie on the same side of the crank shaft in pairs, which are at 120° to each other, the crank pins 11, 12 and 17 being, as is seen in Fig. 4, at 120° to the crank pins 13, 14 and 18, which latter are at 120° to the crank pins 15, 16 and 19. The corresponding cylinders are thus divided into three groups of two working cylinders each and one compressor cylinder, each compression end of a working cylinder in each group coinciding with the compression stroke end of the compressor, and the time, during which the injection air is in the pipe, being shortened. The connecting pipe between the working cylinders and the compressor cylinders is in such an arrangement preferably such that for each group an independent pipe is provided so that the engine has three pipes 20, 21 and 22. In starting only one of the working cylinders is connected with the compressor for instance in the first group of cylinders the cylinder 11 with the compressor 17. The other cylinders are out of operation for instance by air escape means. On the first normal ignition or combustion taking place in the cylinder 11 the cylinders 13 and 15 being started and finally the cylinders 12, 14 and 16. The total length of these three pipes will thus be smaller than the length of a common pipe. As, furthermore, only each two working cylinders are connected together, the further advantage results, that disturbances in working, for instance owing to leakages in the pipe, will occur only in one group, but will not be able to be transmitted to the whole engine.

Another way of protecting the injection air from heat losses consists in placing the connecting pipe in the exhaust pipe or in places which come in contact with the hot exhaust gases. As the temperature of the exhaust gases immediately behind the valves amounts to about 300° C., the connecting pipes cannot give off any heat to the outside under this temperature limit. Fig. 5 shows by way of example a constructional form of the engine with four working cylinders and two laterally placed compressor cylinders, the connecting pipe of which is laid in the exhaust pipe. The working cylinders 31, 32, 33 and 34 and the compressor cylinders 35 and 36 are cast in one piece. The connecting pipe 37 is common to all the cylinders and leads from the compressor into the exhaust pipe 38, where during working it is heated by the exhaust gases. The heat losses of the injection valve correspond to the difference in temperature between the injection air and the walls of the pipe. When starting, it is preferable to allow the first combustion to take place in the working cylinder 34, which lies in the immediate neighbourhood of the compressor cylinder 35 and the piston movement of which coincides with that of the cylinder 34. The injection air is cooled so little on its short journey from the cylinder 35 to the cylinder 34, that the first ignition will take place readily and with certainty.

Figure 6:
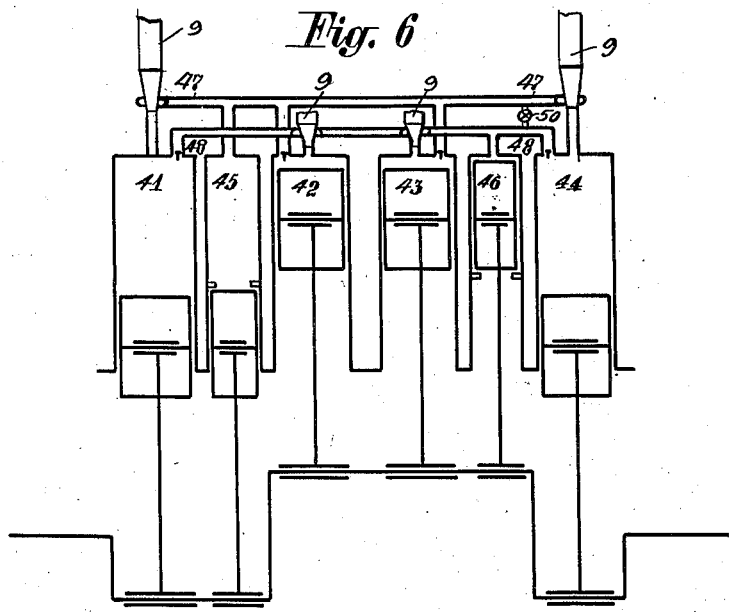
Figure 6 is a diagrammatic representation of a four-cylinder engine with the cylinders grouped in pairs having individual air compressors for each pair.

A further possible way of increasing the injection air pressure for starting is obtained by giving the connecting pipe an additional filling of hot compressed air and combustion gases, which are taken from the working cylinders. This can for instance be effected by connecting the injection pipe of one group of two cylinders and one compressor cylinder, having the pistons traveling in the same direction, to the working cylinders of a second group having pistons traveling in opposite directions, in such a manner that the pipe communicates with these working cylinders through back pressure valves. Fig. 6 shows such a constructional form by way of example as applied to a four-cylinder engine having two connecting pipes, which are given an additional filling of hot working air. The cylinders 41 and 44 are connected to the compressor 45 and the cylinders 42 and 43 to the compressor 46 by the separate connecting pipes 47 and 48. The pipes 47 and 48 being connected by a by-pass passage and valve 50. The crank pins of one connected group of cylinders lie on one side of the crank shaft and are at about 180° to those of the other group of cylinders. Each compression end of the working cylinders coincides with the compression stroke end of a compressor cylinder and the injection air flows across during the fuel injection period. The pressure in the connecting pipes amounts during the fuel injection, for instance, to about 40 to 60 atmospheres. After the fuel injection, it sinks to about 20 atmospheres and only reaches its minimum tension again at the end of the next compression stroke or of the next compressor compression stroke. Since two working cylinders which belong together are in advance of the other two, it is possible to fill the connecting pipes with working air. If, for instance, the pipe 47 is connected to the working cylinders 42 and 43 and the pipe 48 to the working cylinders 41 and 44 in such a manner that the two pipes communicate with these working cylinders through back pressure valves, a certain amount of hot working air will flow at each compression stroke and during the combustions into the connecting pipes and fill the latter to about 30 atmospheres, that is, to the highest compression pressure of the working cylinders. From the corresponding compressor, the injection air will only flow across half a revolution later. As soon as the pressure valve of the compressor lifts, the pressure again mounts to 40—60 atmospheres and the compression air is passed into the working cylinders. The advantage of the additional filling of the connecting pipes resides in the fact that the injection air is very considerably heated and increased, which compensates for the loss in pressure and energy in the connecting pipes, and that the compressor cylinders can be given smaller dimensions.

It is obvious that two or more compressors can be used for a single working cylinder temporarily. This is of advantage in starting, or when the engine is cold, the temperature of the injection air being raised by the increased compression and the fuel admitted being more easily ignited. This can be effected by the pressure pipe of the remaining working cylinder being shut off by suitable members.

One-step compressors will preferably be used, which suffice for producing the injection air, as the latter compresses almost adiabatically and is injected in a highly heated state.

The compressors may be single or double acting.

Patent claims.

1. In a multiple cylinder internal combustion engine the combination of pairs of working cylinders, a compression cylinder and piston for each pair of working cylinders adapted to deliver high pressure air to its corresponding working cylinder and passaged means interconnecting the compressor cylinders of different pairs.

2. In a multiple cylinder internal combustion engine the combination of a plurality of working cylinders and pistons, compressor cylinders and pistons adapted to supply unit charges of compressed air to each working cylinder and means whereby more than one compressor cylinder may supply a given working cylinder.

3. In a multiple cylinder internal combustion engine, the combination of a plurality of working cylinders arranged in groups, a compression cylinder and piston for each group, a shaft driven by the working cylinders and operating the compression cylinders, means for delivering compressed fluid from the compression cylinder to its working cylinders, and means for delivering the heated combustion products of one cylinder into its companion cylinder with fresh fluid.

4. In a multiple cylinder internal combustion engine, the combination of a plurality of working cylinders arranged in pairs, a compression cylinder and piston for each pair of working cylinders, exhaust outlets for the working cylinders, and means connecting the cylinders whereby the exhaust from one cylinder may be mixed with the compressed air of the compression cylinder and delivered to another working cylinder.

5. In a multiple cylinder internal combustion engine, the combination of cylinders arranged in pairs, an air compressor for each pair of cylinders, a supply pipe from a compressor and adapted to supply compressed air to two cylinders of different pairs, exhaust pipes from the other two cylinders of the two pairs connected with the air pipe.

6. In a multiple cylinder internal combustion engine, the combination of a plurality of working cylinders arranged in adjacent pairs, a compression cylinder for each pair of cylinders, an air supply pipe from a compression cylinder and entering a cylinder of different pairs, exhaust pipes from the remaining cylinders of the different pairs and communicating with said supply pipe, a shaft driven by the working cylinders, and crank arms on the shaft and adapted to alternate the strokes of the compression cylinders.

7. In a multiple cylinder internal combustion engine, the combination of groups of working cylinders and injection air compressors for each group delivering the injection air to the corresponding working cylinders, and passaged means connecting the working cylinders of one group to the air injection compressor of another group.

8. In a mulitple cylinder internal combustion engine, the combination of groups of working cylinders and injection air compressors, each of these groups comprising two working cylinders and one injection air compressor, and passaged means connecting the injection air compressor of the one group to the working cylinder of another group.

9. In a multiple cylinder internal combustion engine, the combination of groups of working cylinders and injection air compressors for each group, connecting pipes between the working cylinders and the cooperating compressor cylinders and passaged connection-means between the connection pipe of one group and the working cylinder of the other group.

10. In a multiple cylinder internal combustion engine, the combination of groups of working cylinders and injection air compressors for each group, the pistons in the cylinders of different groups being moved in opposite directions, connecting pipes between the working cylinders and the coordinated compressor cylinders, and connecting means between the connecting pipe of one group of cylinders and the working cylinders of another group the pistons of which travel in the opposite direction.

Vienna Austria July 14, 1921.

FRIEDRICH MÜLLER.